(12) United States Patent
Chen et al.

(10) Patent No.: US 12,067,401 B2
(45) Date of Patent: Aug. 20, 2024

(54) STREAM PROCESSOR WITH LOW POWER PARALLEL MATRIX MULTIPLY PIPELINE

(71) Applicant: Advanced Micro Devices, Inc., Sunnyvale, CA (US)

(72) Inventors: Jiasheng Chen, Orlando, FL (US); Yunxiao Zou, Shanghai (CN); Michael J. Mantor, Orlando, FL (US); Allen Rush, Danville, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 110 days.

(21) Appl. No.: 15/855,637

(22) Filed: Dec. 27, 2017

(65) Prior Publication Data

US 2019/0171448 A1 Jun. 6, 2019

(30) Foreign Application Priority Data

Dec. 1, 2017 (CN) .......................... 201711249532.9

(51) Int. Cl.
*G06F 9/38* (2018.01)
*G06F 7/544* (2006.01)
(Continued)

(52) U.S. Cl.
CPC .......... *G06F 9/3867* (2013.01); *G06F 7/5443* (2013.01); *G06F 9/3001* (2013.01);
(Continued)

(58) Field of Classification Search
CPC .. G06F 7/5443; G06F 9/3001; G06F 9/30036; G06F 9/3867; G06F 17/16
See application file for complete search history.

(56) References Cited

U.S. PATENT DOCUMENTS 5,204,830 A * 4/1993 Wang ...................... G06F 17/16
708/607
6,484,193 B1 11/2002 Choe et al.
(Continued)

OTHER PUBLICATIONS

Outer Product, Chegg, retrieved Dec. 30, 2021, <https://www.chegg.com/homework-help/definitions/outer-product-33> (Year: 2021).*

*Primary Examiner* — Andrew Caldwell
*Assistant Examiner* — Kasim Alli
(74) *Attorney, Agent, or Firm* — Kowert, Hood, Munyon, Rankin & Goetzel, P.C.; Rory D. Rankin

(57) ABSTRACT

Systems, apparatuses, and methods for implementing a low power parallel matrix multiply pipeline are disclosed. In one embodiment, a system includes at least first and second vector register files coupled to a matrix multiply pipeline. The matrix multiply pipeline comprises a plurality of dot product units. The dot product units are configured to calculate dot or outer products for first and second sets of operands retrieved from the first vector register file. The results of the dot or outer product operations are written back to the second vector register file. The second vector register file provides the results from the previous dot or outer product operations as inputs to subsequent dot or outer product operations. The dot product units receive the results from previous phases of the matrix multiply operation and accumulate these previous dot or outer product results with the current dot or outer product results.

20 Claims, 14 Drawing Sheets

(51) Int. Cl.
*G06F 9/30* (2018.01)
*G06F 17/16* (2006.01)
(52) U.S. Cl.
CPC ...... *G06F 9/30036* (2013.01); *G06F 9/30101* (2013.01); *G06F 17/16* (2013.01)

(56) References Cited

U.S. PATENT DOCUMENTS

| | | | |
|---|---|---|---|
| 6,490,607 | B1 | 12/2002 | Oberman |
| 10,120,649 | B2 * | 11/2018 | Hansen ................... G06F 7/523 |
| 11,093,580 | B2 * | 8/2021 | Kazakov ................. G06F 17/16 |
| 2005/0071413 | A1 * | 3/2005 | Schulte ................. G06F 9/3885 708/523 |
| 2005/0257024 | A1 * | 11/2005 | Ray ................. H03K 19/17728 712/11 |
| 2011/0153707 | A1 * | 6/2011 | Ginzburg ............. G06F 9/3001 708/523 |
| 2014/0122840 | A1 * | 5/2014 | Abernathy .......... G06F 9/30101 712/225 |
| 2015/0019836 | A1 * | 1/2015 | Anderson ........... G06F 9/30036 712/3 |
| 2018/0321938 | A1 * | 11/2018 | Boswell ............. G06F 9/30036 |

* cited by examiner

STREAM PROCESSOR WITH LOW POWER PARALLEL MATRIX MULTIPLY PIPELINE

PRIORITY INFORMATION

This application claims benefit of priority to Chinese Application No. 201711249532.9, entitled "Stream Processor With Low Power Parallel Matrix Multiply Pipeline", filed Dec. 1, 2017, the entirety of which is incorporated herein by reference in its entirety.

BACKGROUND

Description of the Related Art

Many different types of computing systems include vector processors or single-instruction, multiple-data (SIMD) processors. Tasks can execute in parallel on these types of parallel processors to increase the throughput of the computing system. It is noted that parallel processors can also be referred to herein as "stream processors". Various types of machine learning algorithms are being implemented on stream processors. Some of these machine learning algorithms implement matrix multiply operations. These matrix multiply operations typically take many cycles to generate results while consuming a large amount of power. Accordingly, techniques for improving the performance, reducing the power consumption, and/or reducing the latency of matrix multiply operations on stream processors are desired.

BRIEF DESCRIPTION OF THE DRAWINGS

The advantages of the methods and mechanisms described herein may be better understood by referring to the following description in conjunction with the accompanying drawings, in which:

FIG. 2 is a block diagram of one embodiment of a matrix multiply operation.

FIG. 10 is a block diagram of another embodiment of a matrix multiply operation.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a low power parallel matrix multiply pipeline are disclosed herein. In one embodiment, a stream processor includes multiple vector register files and multiple execution pipelines coupled to the vector register files. A first execution pipeline includes a plurality of dot products units. In one embodiment, each of these dot product units is configured to perform a dot product operation on first and second sets of operands by calculating a sum of a plurality of products of elements of the first set of operands and corresponding elements of the second set of operands. Each dot product unit is also configured to generate an output which is equal to an accumulated value added to a result of the dot product operation. In one embodiment, the accumulated value is the result of a previous dot product operation. In another embodiment, each of the dot product units is configured to perform a matrix multiply operation by calculating an outer product of the first and second sets of operands.

In one embodiment, the stream processor is configured to read the first and second sets of operands from the first vector register file and provide the first and second sets of operands to the first execution pipeline. In this embodiment, the stream processor is configured to read a plurality of accumulated values from the second vector register file and provide the plurality of accumulated values to the first execution pipeline. Also, the first execution pipeline is configured to write the outputs generated by the dot product units to the second vector register file.

Figure 1:
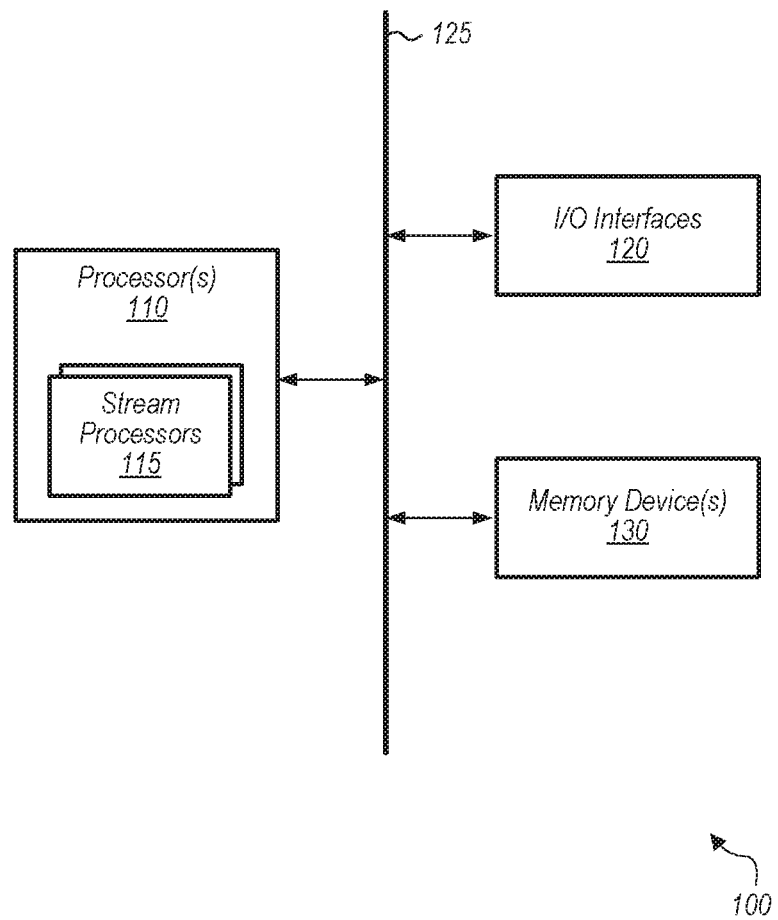
FIG. 1 is a block diagram of one embodiment of a computing system.

Referring now to FIG. 1, a block diagram of one embodiment of a computing system 100 is shown. In one embodiment, computing system 100 includes at least processor(s) 110, input/output (I/O) interfaces 120, bus 125, and memory device(s) 130. In other embodiments, computing system 100 can include other components and/or computing system 100 can be arranged differently. Processors(s) 110 are representative of any number and type of processing units (e.g., central processing unit (CPU), graphics processing unit (GPU), digital signal processor (DSP), field programmable gate array (FPGA), application specific integrated circuit (ASIC)).

In one embodiment, processor(s) 110 includes a vector processor with a plurality of stream processors 115. Each stream processor 115 can also be referred to as a processor or a processing lane. In one embodiment, each stream processor 115 includes at least two types of execution pipelines (e.g., matrix multiply pipeline, fused multiply-add (FMA) pipeline) that share one or more vector register files. In one embodiment, each vector register file includes multi-bank high density random-access memories (RAMs). In various embodiments, execution of instructions can be overlapped on the multiple execution pipelines to increase throughput of the stream processors.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a computer, laptop, mobile device, server, game console, or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 1.

Figure 2:
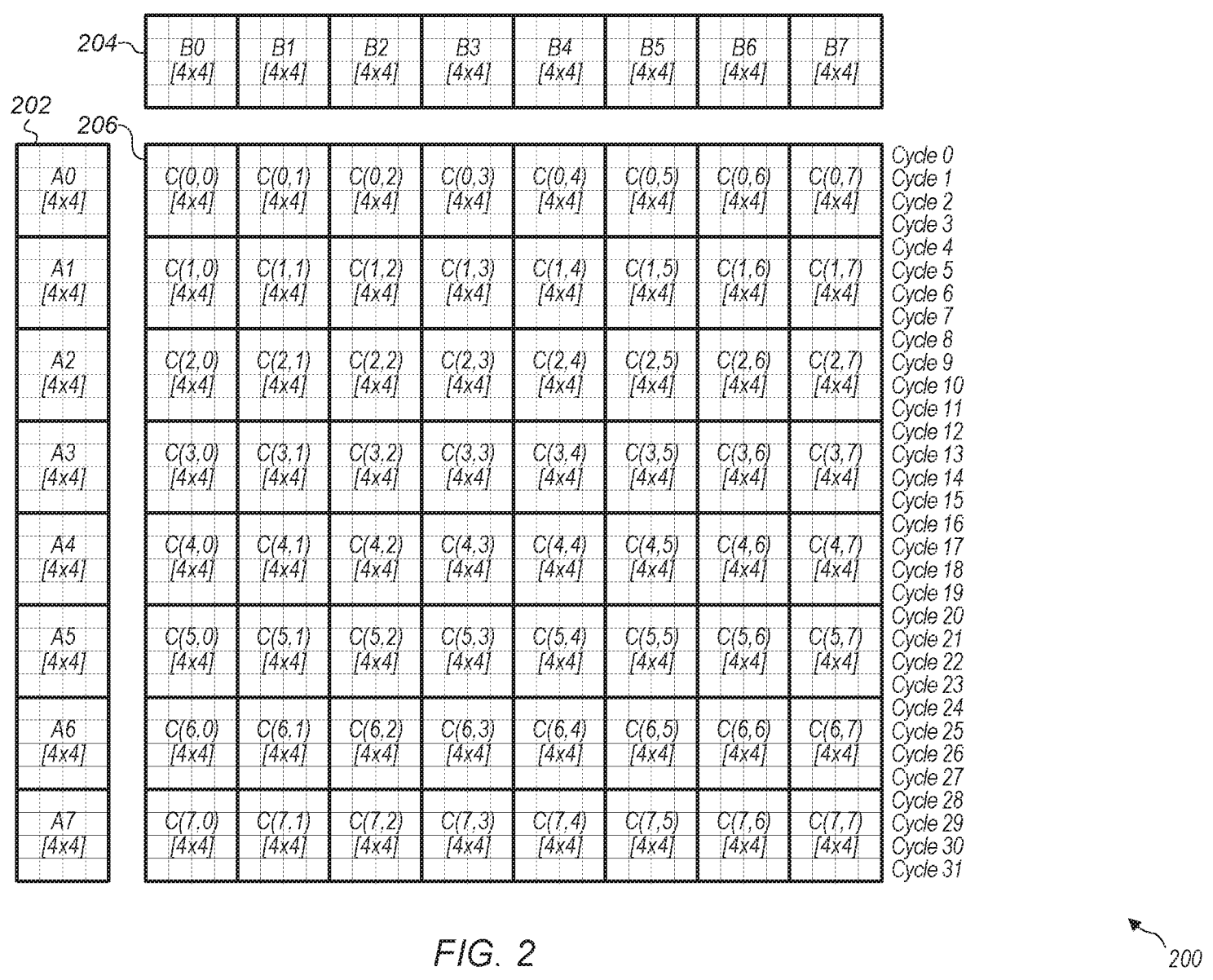

Turning now to FIG. 2, a block diagram 200 of one embodiment of a matrix multiply operation is shown. In one embodiment, matrix 202 is multiplied by matrix 204 to generate matrix 206. Matrix 202 can also be referred to as matrix A, matrix 204 can also be referred to as matrix B, and matrix 206 can also be referred to as matrix C. In one embodiment, matrix 202 is a 32×4 matrix and matrix 204 is a 4×32 matrix. Matrix 202 and matrix 204 can be stored in any of the banks of a vector general purpose register (VGPR) file. In some embodiments, matrix 202 is a portion of a first matrix and matrix 204 is a portion of a second matrix. The first and second matrices can be partitioned into smaller matrices, with matrix multiply operations being performed on the smaller matrices.

In one embodiment, the data of each entry in matrix 202 and matrix 204 is a 16-bit floating point value. In other embodiments, the data can be represented in other formats and/or with other numbers of bits. In one embodiment, matrix 202 includes values of an input dataset and matrix 204 includes weighting values to be applied to the input dataset. In this embodiment, elements of the input dataset are multiplied by the weighting values and then accumulated into a sum which represents a neuron of a neural network. In one embodiment, the neurons can be compared to thresholds to determine if the neurons are activated by the input values. In other embodiments, other types of decisions can be made based on the neuron values, and/or the neuron values can be fed into another layer of the neural network.

In one embodiment, an outer product matrix multiply operation is performed on matrix 202 and matrix 204 to produce matrix 206. The outer product matrix multiply operation is performed to minimize the internal and external memory bandwidth that is utilized when fetching the input matrices 202 and 204. The outer product matrix multiply operation also reduces data movement through the processor. For example, in one embodiment, the elements of matrix 202 and 204 are fetched once and then reused over multiple cycles. Also, in one embodiment, data path toggling is reduced by keeping matrix 204 unchanged as matrix 204 is provided to the matrix multiply pipeline.

As shown in diagram 200 of FIG. 2, during a first cycle (cycle 0), the first row of matrix 202 is multiplied by the columns of matrix 204 using a matrix multiply pipeline. It is noted that the matrix multiply pipeline can also be referred to as a matrix multiply unit. In a second cycle (cycle 1), the second row of matrix 202 is multiplied by the columns of matrix 204. This pattern can continue for the rest of the 32 cycles to complete the matrix multiply operation between matrix 202 and matrix 204 to generate matrix 206.

In one embodiment, a plurality of four-operand dot product (sometimes referred to as an inner product) operations are performed between the first row of matrix 202 and the columns of matrix 204 in a first clock cycle. Then, in a second clock cycle, a plurality of four-operand dot product operations are performed between the second row of matrix 202 and the columns of matrix 204. This pattern can continue for the remaining rows of matrix 202 for the other cycles of the 32-cycle sequence. In another embodiment, a matrix multiply operation is performed by calculating an outer product of the first row of matrix 202 and the columns of matrix 204 in a first clock cycle. In a second clock cycle, the outer product of the second row of matrix 202 and the columns of matrix 204 is calculated. This pattern continues for the other rows of matrix 202. It is noted that in other embodiments, the size of the matrices and/or the size of the matrix multiply pipeline can vary.

Figure 3:
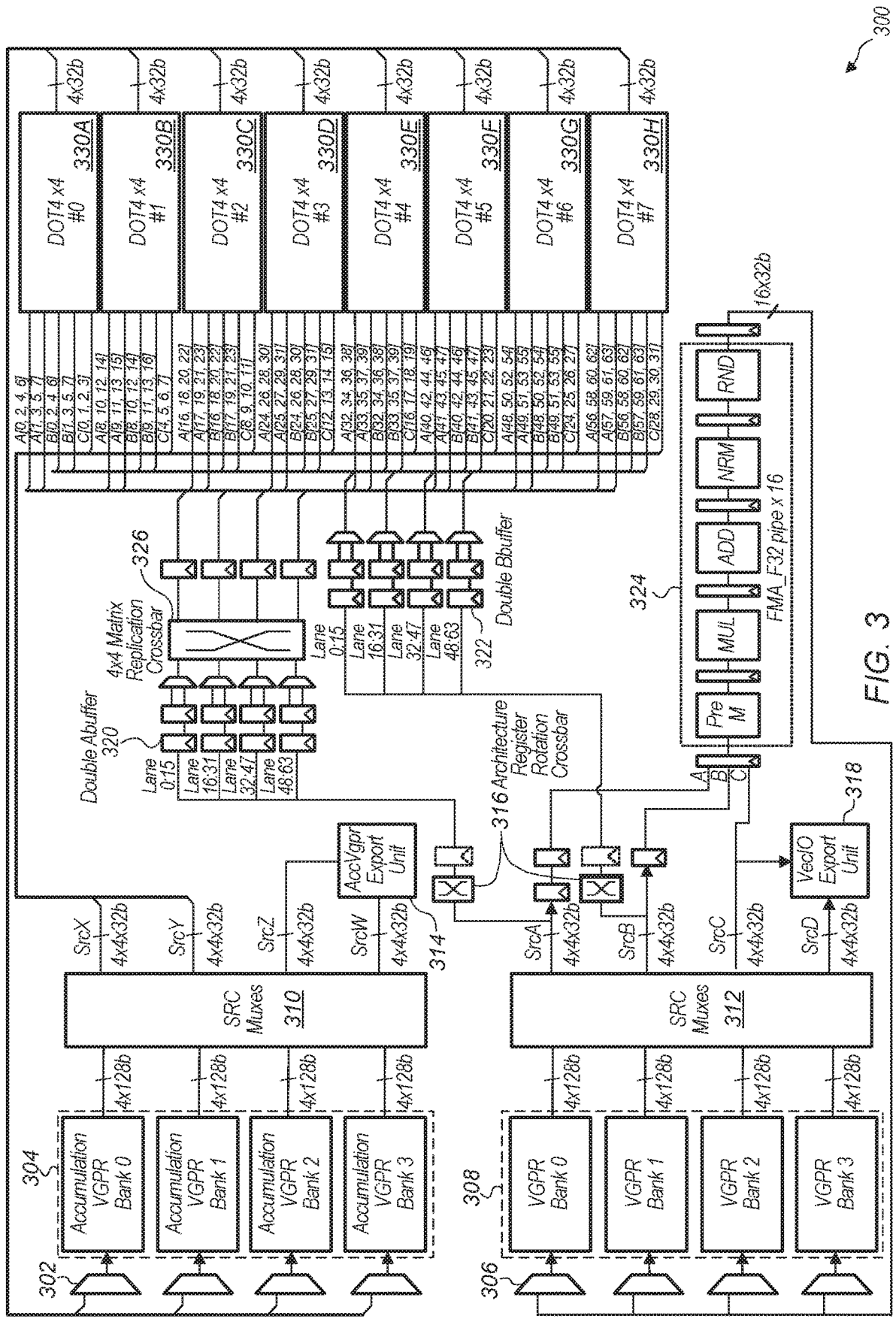
FIG. 3 is a block diagram of one embodiment of a stream processor.

Referring now to FIG. 3, a block diagram of one embodiment of stream processor 300 is shown. In one embodiment, the components of stream processor 300 are included in each of stream processors 115 (of FIG. 1). It is noted that the architecture of stream processor 300 is intended to represent one particular implementation of a stream processor. It should be understood that the architecture of stream processor 300 can vary in other embodiments. For example, the data widths (e.g., 128 bits (b), 32b) of some paths are indicated throughout the architecture but these paths can have other widths in other embodiments. Also, the number of lanes per path can also be different than what is shown in stream processor 300. Additionally, while 32 DOT4 units 330A-H are shown in the matrix multiply pipeline of stream processor 300, other pipelines can have other numbers and/or other sizes of dot product units (e.g., DOT8 units).

In one embodiment, stream processor 300 includes two separate vector register files 304 and 308. The vector register files 304 and 308 can also be referred to as vector general purpose register (VGPR) files. Additionally, VGPR file 304 can be referred to as accumulation VGPR file 304 and VGPR file 308 can be referred to as architecture VGPR file 308. Accumulation VGPR file 304 and source muxes 310 are coupled together to build a single VGPR file that provides multiple read ports X, Y, Z, and W. Accordingly, matrix C and matrix D can be stored in any of the banks of accumulation VGPR file 304. Architecture VGPR file 308 and source muxes 312 are coupled together to build a single VGPR file that provides multiple read ports A, B, C, and D. Accordingly, matrix A and matrix B can be stored in any of the banks of architecture VGPR file 308.

In one embodiment, the outputs of DOT4 units 330A-H are coupled back to the inputs of accumulation VGPR 304 via multiplexers (or muxes) 302. Source X and source Y operands read from banks 0 and 1 of accumulation VGPR 304 are coupled through muxes 310 to the inputs of DOT4 units 330A-H. Also, the source Z and source W operands are coupled to accumulator VGPR export unit 314 to be written to memory (not shown) or another location. In one embodiment, each DOT4 unit 330A-H is configured to generate a dot product of two input vectors. For example, for input vectors X and Y having elements i from 0 to 3, the dot product generated by each DOT4 unit 330A-H is equal to $x_0y_0+x_1y_1+x_2y_2+x_3y_3$. Each DOT4 unit 330A-H can also add an intermediate result to the dot product so that longer dot products can be calculated by performing multiple four-element dot products and accumulating the intermediate results. For example, a dot product for an (i+1) iteration can be calculated by each DOT4 unit 330A-H as: dot-product(i+1)=$x_0y_0+x_1y_1+x_2y_2+x_3y_3$+dot-product(i). Each DOT4 unit 330A-H includes a plurality of multiplier accumulators (MACs) to perform the dot product operations. In another embodiment, each DOT4 unit 330A-H is configured to generate an outer product of two input vectors. For example, for input vectors with four elements each, the outer product generated by each DOT4 unit 330A-H would be a 4×4 matrix.

As noted above, a first set of operands are coupled to DOT4 units 330A-H from accumulation VGPR 304. Also, a second set of operands are coupled to DOT4 units 330A-H from architecture VGPR 308. The second set of operands include the elements of the A and B matrices that are read out of banks 0 to 3 of VGPR 308. The intermediate results of the matrix multiply operation of the A and B matrices are written to accumulation VGPR 304, and the intermediate results are routed back from banks 0-1 of accumulation VGPR 304 to DOT4 units 330A-H. Additionally, operands from bank 2 of architecture VGPR 308 are coupled to FMA pipeline 324 and vector input/output (I/O) export unit 318. Operands from bank 3 of architecture VGPR 308 are coupled to vector input/output (I/O) export unit 318. The four banks of architecture VGPR 308 are used to implement a pseudo multi-port register file. The source muxes 312 are designed to provide this multi-port capability for architecture VGPR 308. The outputs from FMA pipeline 324 are coupled back to architecture VGPR 308 via muxes 306. It is noted that in other embodiments, accumulation VGPR 304 and architecture VGPR 308 can have other numbers of banks besides four.

In one embodiment, the source A and B operands are coupled from architecture VGPR 308 to DOT4 units 330A-H via data paths with multiple components. In one embodiment, these data path includes source muxes 312, architecture register rotation crossbars 316, double buffers 320 and 322, and crossbar 326. Architecture register rotation crossbars 316 are utilized to rotate the A and B operands into the appropriate lanes to be coupled to DOT4 units 330A-H to perform the dot product operations on the appropriate matrix elements. Double buffer 320 for the A operands and double buffer 322 for the B operands are utilized to store the operands such that the operands can be utilized in multiple cycles without having to be refetched from architecture VGPR 308. The output of double buffer 320 is coupled to 4×4 matrix replication crossbar 326 to rotate the operands between lanes depending on which phase of the matrix multiply operation is being performed. It is noted that in other embodiments, other suitable types of buffers can be utilized in place of double buffers 320 and 322.

In one embodiment, the operands are coupled from accumulation VGPR 304 and architecture VGPR 308 to DOT4 units 330A-H so as to reduce the external memory bandwidth utilization of stream processor 300 when performing a matrix multiply operation. The elements of the A and B matrices are read a single time from architecture VGPR 308, and then these elements are fed to DOT4 units 330A-H from double buffers 320 and 322 over multiple cycles. In one embodiment, the elements of the B matrix that are coupled to DOT4 units 330A-H are not toggled over these multiply cycles. This helps to reduce the amount of power that is consumed during the matrix multiply operation.

The A and B operands from architecture VGPR 308 are also coupled to the fused multiply add (FMA) pipeline 324. When the A and B operands are read from architecture VGPR 308 in a first clock cycle and coupled to DOT4 units 330A-H, these A and B operands can be reused in subsequent clock cycles. This allows operands to be read from architecture VGPR 308 in subsequent clock cycles and provided to FMA pipeline 324. This enables overlapped, concurrent execution to occur on pipelines 330 and 324.

Figure 4:
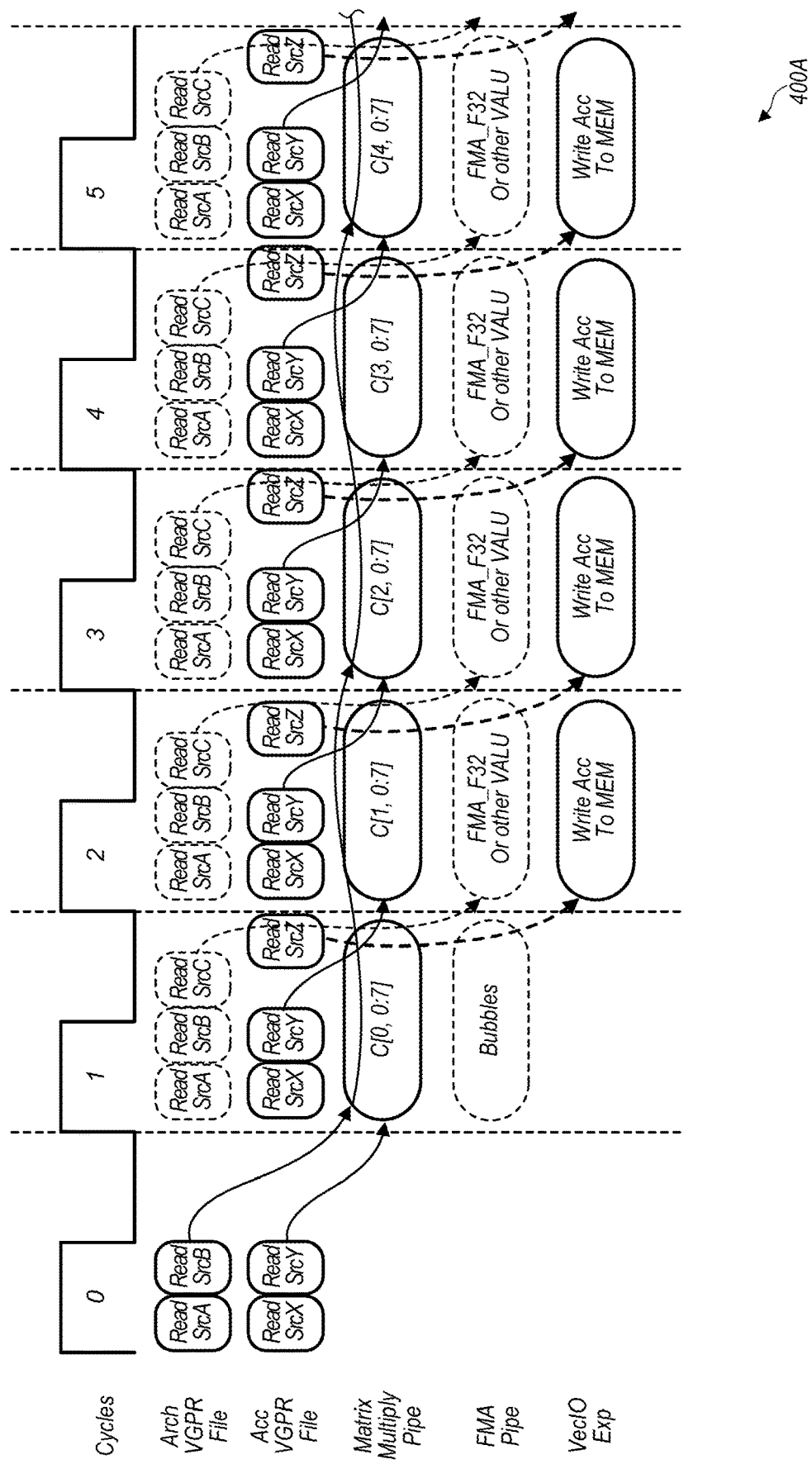
FIG. 4 is a timing diagram of one embodiment of overlapping execution on execution pipelines.

Turning now to FIG. 4, a timing diagram 400A of one embodiment of overlapping execution on execution pipelines is shown. It can be assumed for the purposes of this discussion that timing diagram 400A applies to the execution of instructions on stream processor 300 (of FIG. 3). The operations that are shown in timing diagram 400 are merely indicative of one particular embodiment. In other embodiments, other sequences of operations can be executed on stream processor 300. The cycles shown at the top of timing diagram 400A indicate clock cycles for stream processor 300. In one embodiment, each cycle illustrated in timing diagram 400A represents four actual clock cycles for the dot product units of the matrix multiply pipeline to generate the results of the given phase of the matrix multiply operation. In other embodiments, each cycle shown in timing diagram 400A can represent other numbers of actual clock cycles.

In cycle 0, source A and source B operands are read from the architecture VGPR file and source X and source Y operands are read from the accumulation VGPR file. These operands are provided to the matrix multiply pipeline to be used in cycle 1. During cycle 1, source operands can be read from the architecture VGPR file and provided to the FMA pipeline so that execution can overlap on both the matrix multiply pipeline and the FMA pipeline. This allows the stream processor to perform different operations in concurrent cycles. Also, during cycle 1, the source X and Y operands are read from the accumulation VGPR file and provided to the matrix multiply pipeline to be used in cycle 2. This pattern can continue for subsequent cycles, with the source X and Y operands being read from the accumulation VGPR file and provided to the matrix multiply pipeline.

Also, during cycle 1, the accumulation source Z operands can be read from the accumulation VGPR file. These accumulation source Z operands can then be written to memory in cycle 2. This pattern of reading accumulation source Z operands from the accumulation VGPR file and then writing these values to memory can occur in subsequent cycles. Also, the source A and B operands can be stored in double buffers (or other temporary storage) and rotated to shift the operands to the appropriate lanes of the matrix multiply pipeline in subsequent cycles.

Figure 5:
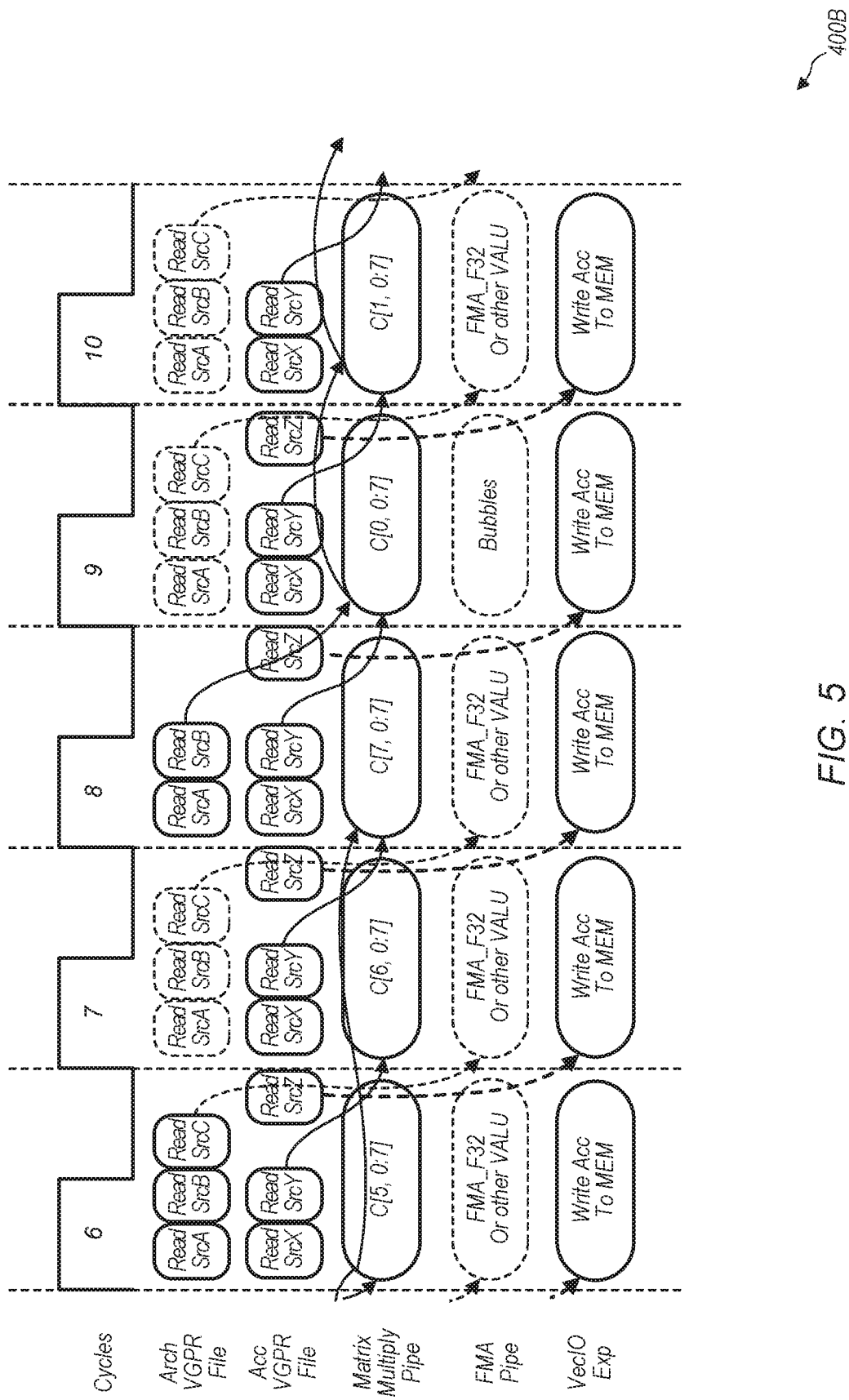
FIG. 5 is a timing diagram of another embodiment of overlapping execution on execution pipelines.

Referring now to FIG. 5, another embodiment of a timing diagram 400B of overlapping execution on execution pipelines is shown. Timing diagram 400B is intended to represent a continuation of timing diagram 400A (of FIG. 4). In the subsequent cycles 6-10, the same pattern of operations shown in timing diagram 400A can continue for timing diagram 400B for operations performed on stream processor 300 (of FIG. 3).

In one embodiment, in cycle 8, the matrix multiply operation completes for a first set of matrix elements. In cycle 8, a new set of matrix elements are retrieved from the architecture VGPR file and read into double buffers. During cycle 9, there is a bubble for the FMA pipeline since the FMA pipeline will not be able to access the architecture VGPR file during cycle 8. However, starting with cycle 9, the FMA pipeline can again access the architecture VGPR file and start reading operands for new FMA operations which can be performed in parallel with the matrix multiply operations being performed in cycle 10 and subsequent cycles. While diagram 400B stops in cycle 10, the subsequent cycles can follow the same pattern of operations illustrated in diagrams 400A-B.

Figure 6:
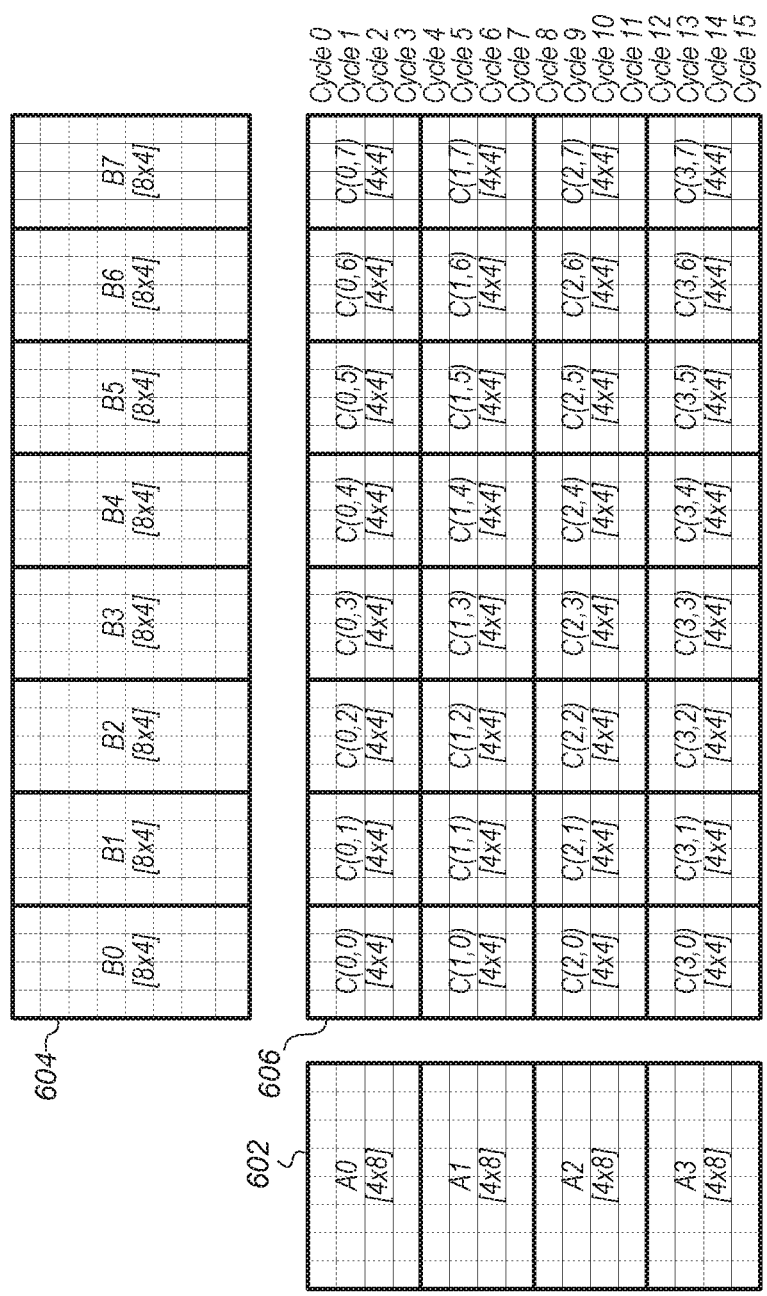
FIG. 6 is a block diagram of another embodiment of a matrix multiply operation.

Turning now to FIG. 6, a block diagram 600 of another embodiment of a matrix multiply operation is shown. In one embodiment, A matrix 602 is multiplied by B matrix 604 to generate C matrix 606. In one embodiment, A matrix 602 is partitioned into 4×8 portions and B matrix 604 is partitioned into 8×4 portions for the matrix multiply operation. As shown in diagram 600, in cycle 0, the first row of A matrix 602 is multiplied by each column of B matrix 604 to generate the first row of C matrix 606. In cycle 1, the second row of A matrix 602 is multiplied by each column of B matrix 604 to generate the second row of C matrix 606. This pattern can continue for the remainder of the rows of A matrix 602 for cycles 2-15.

Figure 7:
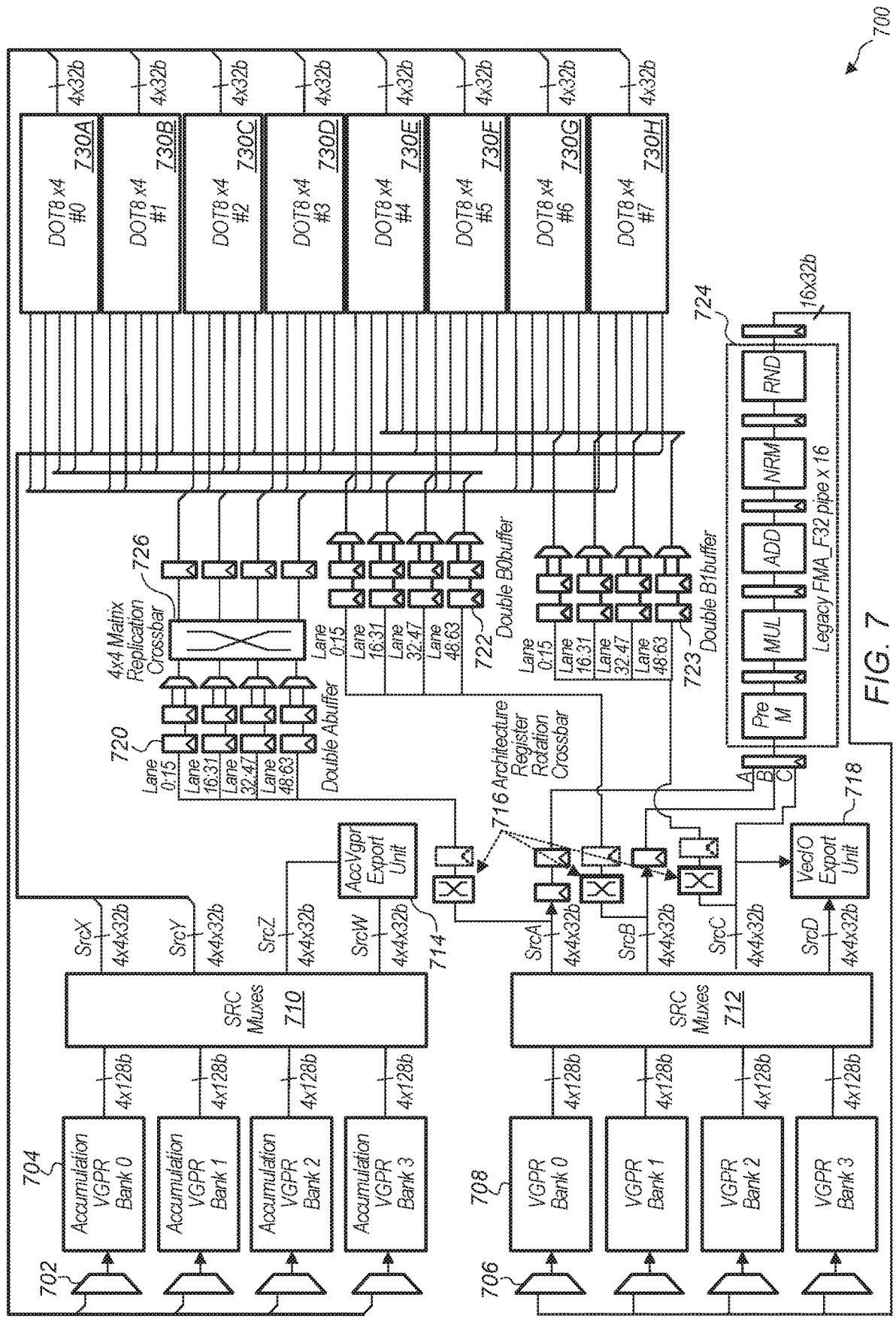
FIG. 7 is a block diagram of another embodiment of a stream processor.

Referring now to FIG. 7, a block diagram of another embodiment of a stream processor 700 is shown. In one embodiment, the components of stream processor 700 are included in each of stream processors 115 (of FIG. 1). In one embodiment, stream processor 700 includes two separate vector register files. A first vector register file is accumulation VGPR file 704. The outputs of DOT8 units 730A-H are coupled back to the inputs of accumulation VGPR file 704 via multiplexers 702. The second register file is architecture VGPR file 708. The outputs of FMA pipeline 724 are coupled to the inputs of architecture VGPR file 708 via multiplexers 706. Read ports X and Y of accumulation VGPR file 704 are coupled through source muxes 710 to the input ports of DOT8 units 730A-H. Read ports Z and W of accumulation VGPR file 704 are coupled to export unit 714.

The DOT8 units 730A-H are representative of a matrix multiply pipeline. In other embodiments, other numbers of DOT8 units can be combined to form matrix multiply pipelines of other dimensions. For example, in another embodiment, 16 DOT8 units can be combined together to form a matrix multiply pipeline. In a further embodiment, 32 DOT8 units can be combined together to form a matrix multiply pipeline. Other embodiments can include other numbers of DOT8 units. Also, in additional embodiments, other sizes of dot product units (e.g., DOT4 units, DOT16 units) can be combined together and utilized to implement a matrix multiply pipeline.

In one embodiment, each DOT8 unit 730A-H is configured to implement a dot product operation of eight elements from a first matrix (e.g., A matrix 602 of FIG. 6) by the corresponding eight elements from a second matrix (e.g., B matrix 604 of FIG. 6) to generate a single output. These outputs are written back to accumulation VGPR file 704 and also coupled back to DOT8 units 730A-H to be added back into the next dot product operations that are performed for each subsequent set of eight elements from the first matrix and the corresponding eight elements from the second matrix. In another embodiment, each DOT8 unit 730A-H is configured to implement an outer product operation of eight elements from a first matrix (e.g., A matrix 602 of FIG. 6) by the corresponding eight elements from a second matrix (e.g., B matrix 604 of FIG. 6) to generate an 8×8 matrix.

Operands of ports A, B, and C of architecture VGPR file 708 are coupled to source muxes 712 and then through crossbars 716. Operands of architecture VGPR file 708 of ports C and D are coupled to vector I/O export unit 718. After crossbars 716, the operands of ports A, B, and C of architecture VGPR file 708 are coupled to double buffers 720, 722, and 723, respectively. Double buffers 720, 722, and 723 are configured to provide operands to DOT8 units 730A-H for multiple cycles without having to read the operands from architecture VGPR file 708 in subsequent cycles. Accordingly, operands can be read from ports A, B, and C of architecture VGPR file 708 in one cycle and then used in multiple subsequent cycles. During these subsequent cycles, operands can be read from architecture VGPR file 708 and provided to FMA pipeline 724. This allows for overlapped execution of different operations to occur on DOT8 units 730A-H and FMA pipeline 724 after the first cycle. The outputs of FMA pipeline 724 are coupled back to architecture VGPR file 708 via muxes 706.

In one embodiment, operands from port C of architecture VGPR file 708 are coupled to DOT8 units 730E-H to be used in the matrix multiply operation. In this embodiment, operands from port B of architecture VGPR file 708 are coupled to DOT8 units 730A-D to be used in the matrix multiply operation. Also, in this embodiment, operands from port A of architecture VGPR file 708 are coupled to DOT8 units 730A-H to be used in the matrix multiply operation. Additionally, operands from port A of architecture VGPR file 708 pass through crossbar 726 to allow the operands to be rotated to the correct lanes for each phase of the matrix multiply operation.

Figure 8:
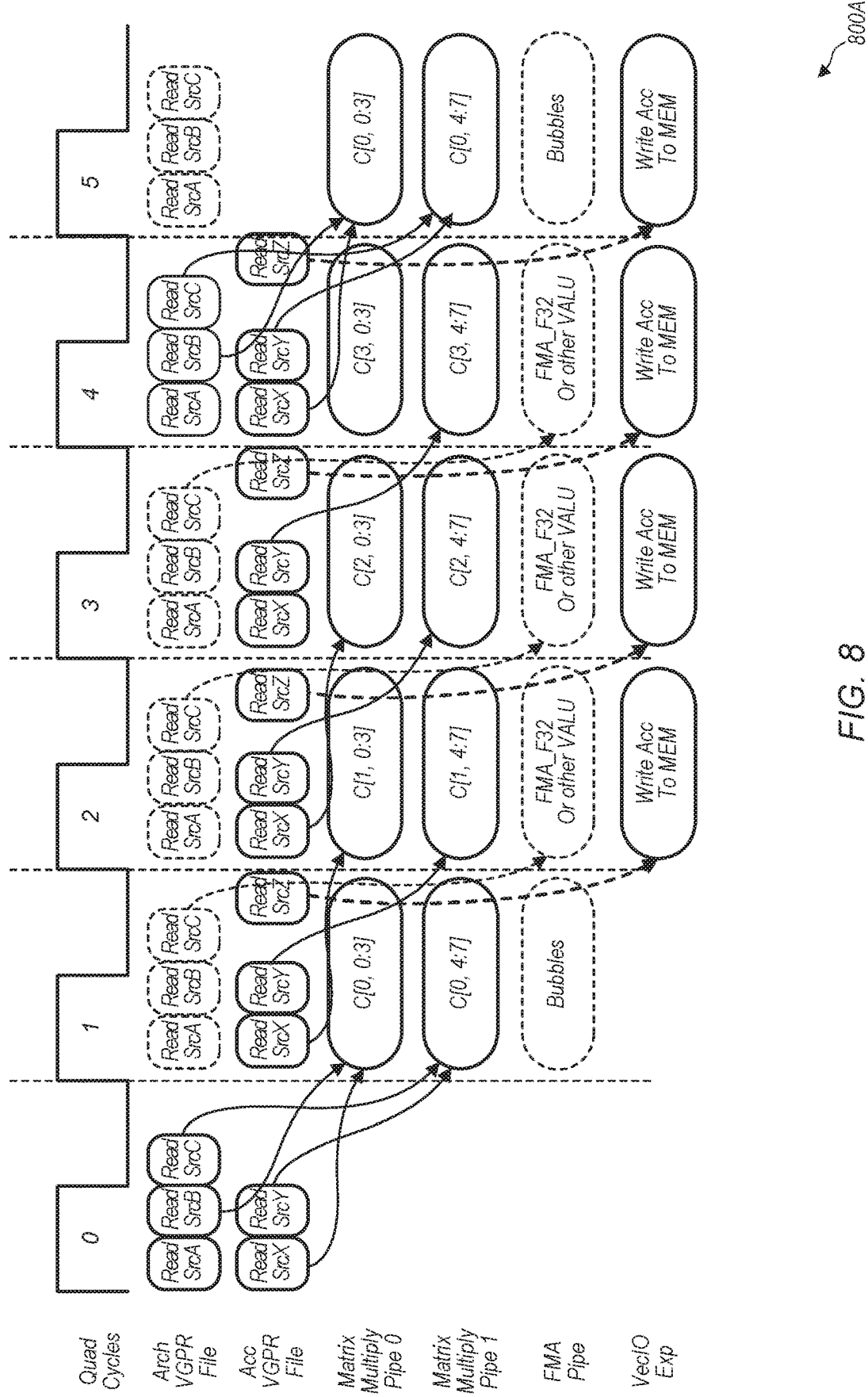
FIG. 8 is a timing diagram of one embodiment of performing a matrix multiply operation.

Turning now to FIG. 8, one embodiment of a timing diagram 800A for performing a matrix multiply operation is shown. Timing diagram 800A is intended to represent the timing of operations for the stream processor 700 of FIG. 7. In one embodiment, in cycle 0, the operands for source A and source B are read from the architecture VGPR file and coupled to the first matrix multiply pipeline (i.e., DOT8 units 730A-D) of the stream processor. Also, in cycle 0, the operands for source A and source C are read from the architecture VGPR file and coupled to the second matrix multiply pipeline (i.e., DOT8 units 730E-H) of the stream processor. These operands for sources A, B, and C, which are read from the architecture VGPR file in cycle 0, are stored in temporary storage (e.g., double buffers) and reused in subsequent cycles. This helps to reduce the number of accesses which are made to the architecture VGPR file in subsequent cycles. Additionally, this allows the FMA pipeline to fetch operands from the architecture VGPR file in subsequent cycles and enables overlapped execution to occur for the matrix multiply pipelines and the FMA pipeline starting with cycle 2. Also, in cycle 0, the operands for source X are read from the accumulation VGPR file and coupled to the first matrix multiply pipeline and the operands for source Y are read from the accumulation VGPR file and coupled to the second matrix multiply pipeline. In cycle 1, the matrix multiply pipeline generates dot or outer product results for the first row of the output matrix C.

In cycle 1, the source A, B, and C operands can be read from the architecture VGPR file and then coupled to the FMA pipeline in cycle 2. Also, in cycle 1, the source X and Y operands can be read from the accumulation VGPR file and then provided to the first and second matrix multiply pipelines, respectively, in cycle 2. Additionally, in cycle 1, the source Z operands can be read from the accumulation VGPR file and then written to memory in cycle 2. This pattern of operations can continue for the subsequent cycles 3-5 as shown in timing diagram 800A. In the subsequent cycles, the matrix multiply pipelines generate subsequent rows in the output C matrix.

Figure 9:
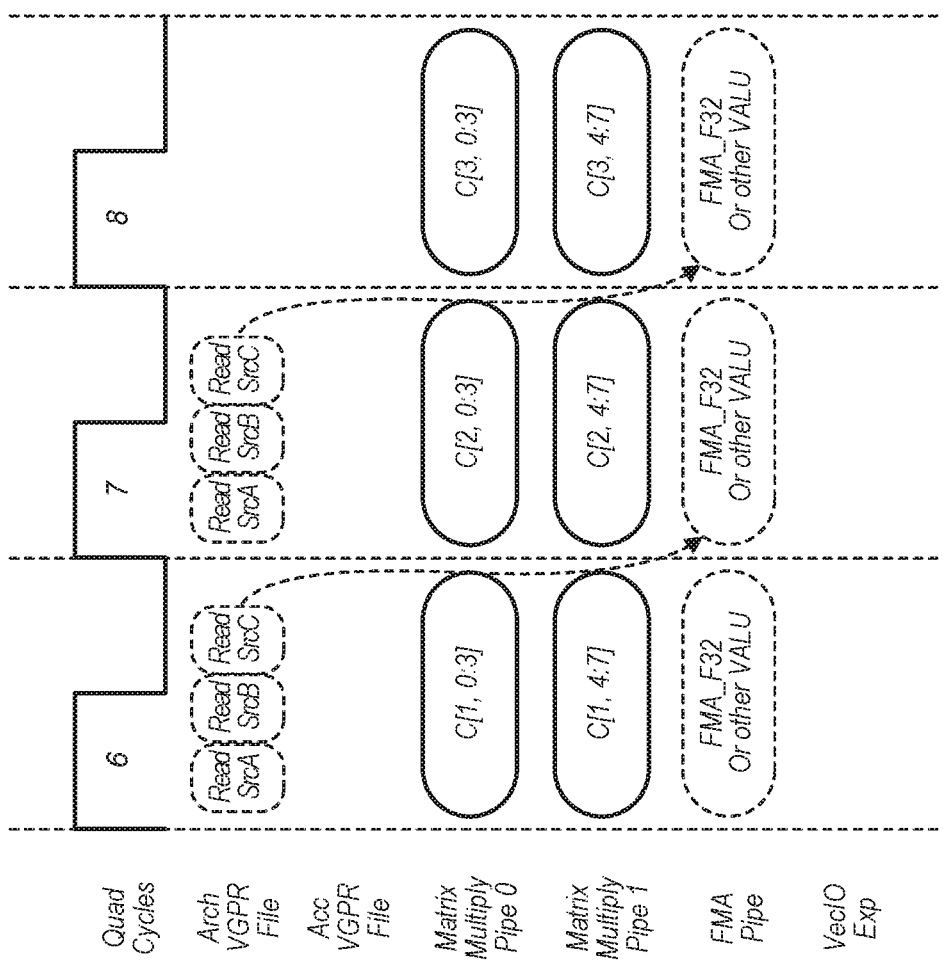
FIG. 9 is a timing diagram of another embodiment of performing a matrix multiply operation.

Referring now to FIG. 9, another embodiment of a timing diagram 800B for performing a matrix multiply operation is shown. Timing diagram 800B is intended to be a continuation of the operations shown in timing diagram 800A (of FIG. 8). In cycles 6, 7, and 8, the matrix multiply pipeline generates additional rows in the output C matrix following the same pattern as shown in timing diagram 800A.

Figure 10:
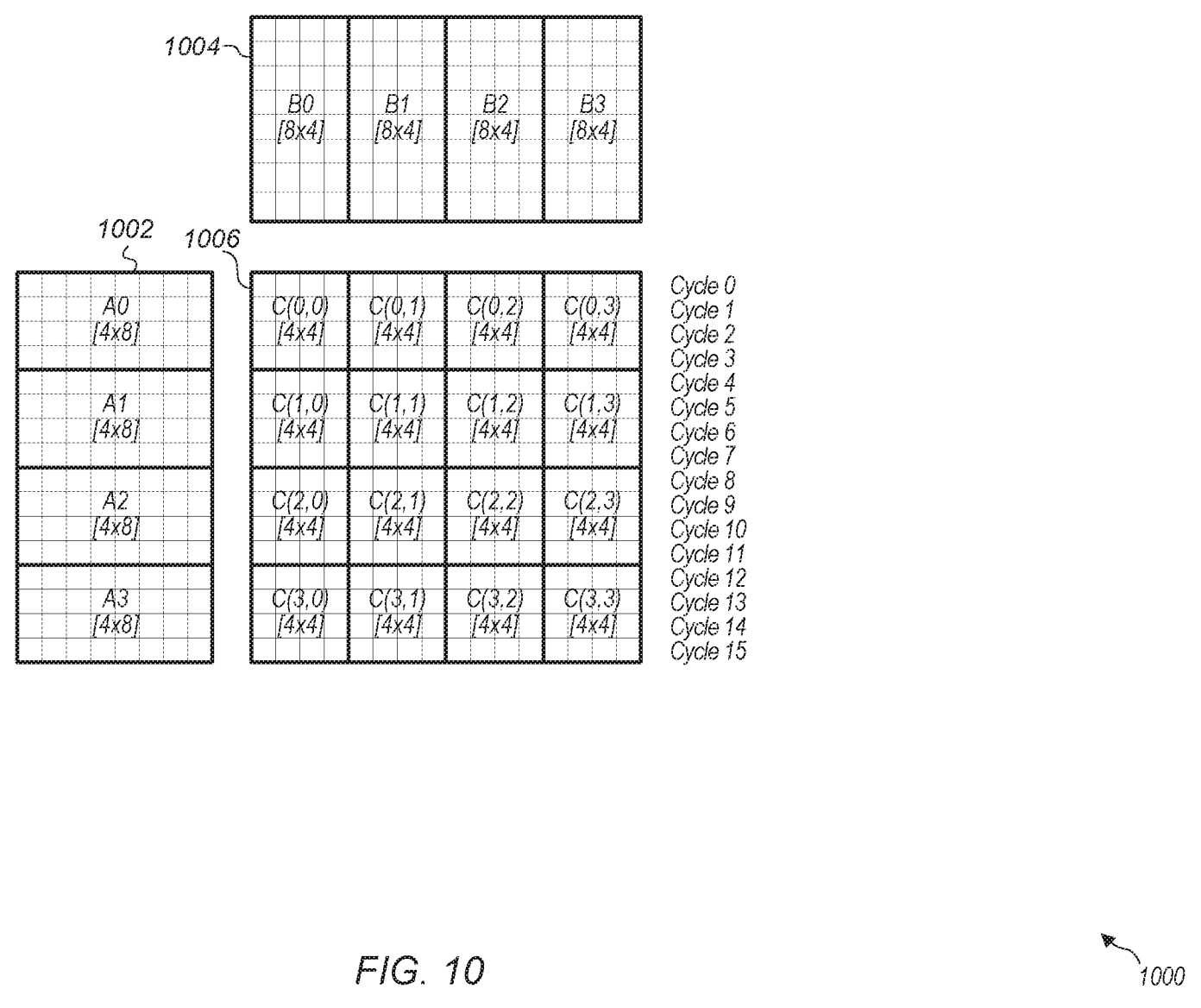

Turning now to FIG. 10, a block diagram of another embodiment of a matrix multiply operation 1000 is shown. In one embodiment, an A matrix 1002 of size 16×8 is multiplied by a B matrix 1004 of size 8×16 to generate a C matrix 1006 of size 16×16. In one embodiment, A matrix 1002 is multiplied by B matrix 1004 using a matrix multiply pipeline which includes dot product units configured to perform dot or outer product operations on eight pairs of input operands. In one embodiment, the matrix multiply operation of A matrix 1002 multiplied by B matrix 1004 takes 16 cycles.

Figure 11:
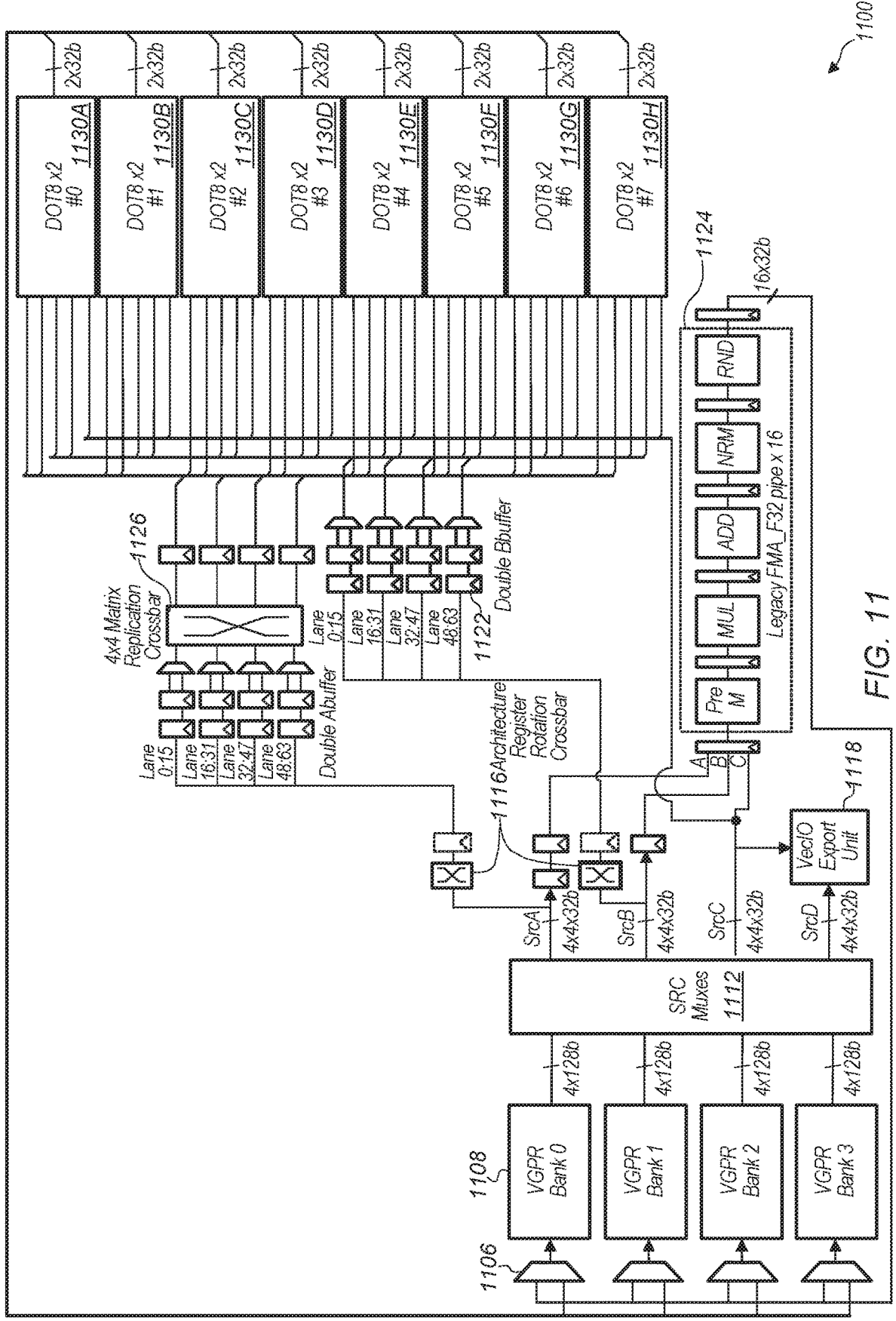
FIG. 11 is a block diagram of another embodiment of a stream processor.

Referring now to FIG. 11, a block diagram of another embodiment of a stream processor 1100 is shown. In one embodiment, the components of stream processor 1100 are included in each of stream processors 115 (of FIG. 1). In one embodiment, stream processor 1100 is configured to perform the matrix multiply operation illustrated in diagram 1000 (of FIG. 10). In one embodiment, stream processor 1100 includes a single architecture VGPR file 1108. Compared to the other stream processors 300 and 700 shown in FIG. 3 and FIG. 7, respectively, stream processor 1100 does not include an accumulation VGPR file. Instead, the outputs of DOT8 units 1130A-H are coupled back to architecture VGPR file 1108 via muxes 1106. Also, the outputs of FMA pipeline 1124 are coupled back to architecture VGPR file 1108 via muxes 1106.

In one embodiment, the A matrix 1002 (of FIG. 10) is stored in bank 0 of architecture VGPR file 1108 and the B matrix 1004 (of FIG. 10) is stored in bank 1 of architecture VGPR file 1108. The elements of these matrices are coupled through source muxes 1112 and then architecture register rotation crossbars 1116. The outputs of architecture register rotation crossbars 1116 are coupled to double buffer 1120 for A matrix 1002 and to double buffer 1122 for B matrix 1004. The outputs of double buffer 1120 are coupled through replication crossbar 1126 and then to DOT8 units 1130A-H. The outputs of double buffer 1122 are also coupled to DOT8 units 1130A-H.

In one embodiment, DOT8 units 1130A-H are configured to perform dot or outer product operations between the rows of A matrix 1002 and the columns of B matrix 1004. The results of these dot or outer product operations are coupled back to architecture VGPR file 1108 via muxes 1106. The results of previous dot or outer product operations, which are labeled as the Source C operands out of source muxes 1112, can be coupled back to the inputs of DOT8 units 1130A-H for further accumulation. Additionally, after A matrix 1002 and B matrix 1004 are read from architecture VGPR file 1108 in a first cycle, operands can be read from architecture VGPR file 1108 in subsequent cycles and provided to FMA pipeline 1124. This allows overlapped execution to be performed on DOT8 units 1130A-H and FMA pipeline 1124. It is noted that DOT8 units 1130A-H can also be referred to as a matrix multiply pipeline. Also, banks 2 and 3 of architecture VGPR file 1108 can be written to vector I/O export unit 1118 to export the results generated by DOT8 units 1130A-H or FMA pipeline 1124.

Figure 12:
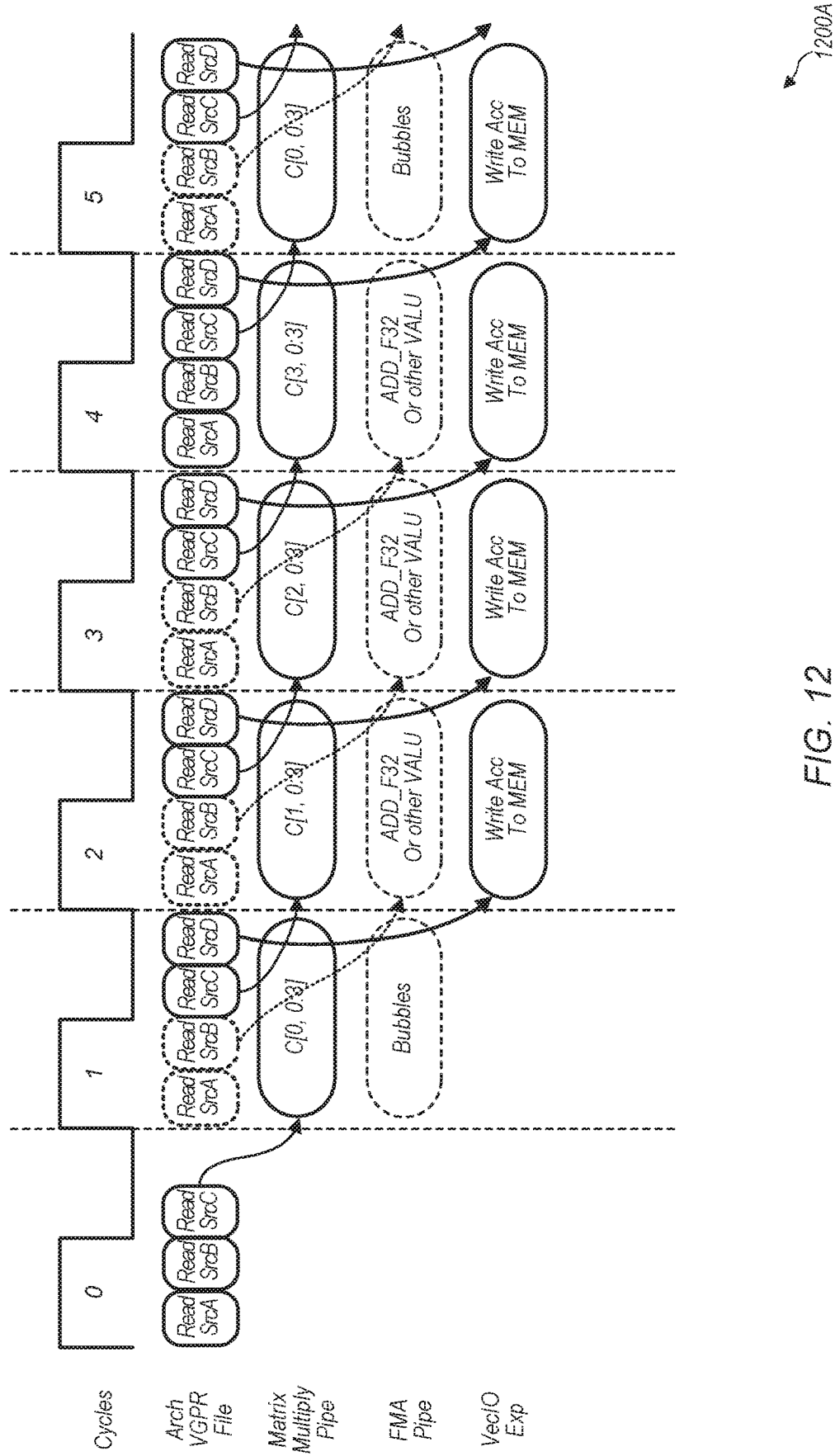
FIG. 12 is a timing diagram of one embodiment of performing a matrix multiply operation.

Turning now to FIG. 12, one embodiment of a timing diagram 1200A for performing a matrix multiply operation is shown. Timing diagram 1200A illustrates the sequence of steps that can be implemented to perform a matrix multiply operation on stream processor 1100 (of FIG. 11). In cycle 0, the source A, source B, and source C operands are read from the architecture VGPR file. In cycle 1, the source A, source B, and source C operands are provided to the matrix multiply pipeline. Also in cycle 1, the source A and source B operands can be read from the architecture VGPR file and provided to the FMA pipeline in cycle 2 to do two operand instructions. In cycle 1, the FMA pipeline is idle but the FMA pipeline can initiate operations starting in cycle 2. Additionally, the source D operands can be read from the accumulation VGPR file in cycle 1 and written to memory in cycle 2. This pattern of operations can continue in cycles 2-4 until the matrix multiply operation is completed by the matrix multiply pipeline. A new matrix multiply operation can be initiated in cycle 5 while the FMA pipeline is idle in cycle 5.

Figure 13:
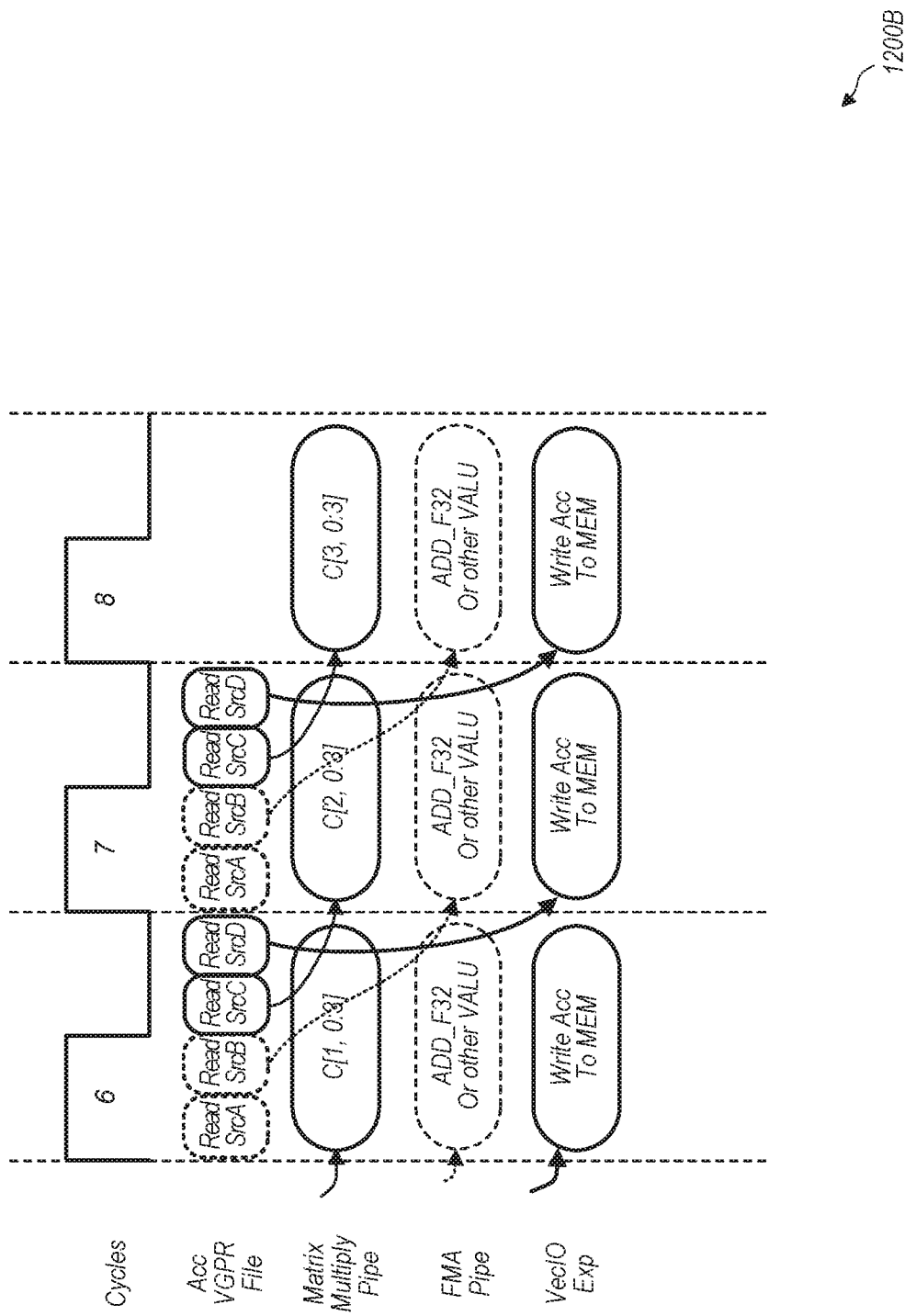
FIG. 13 is a timing diagram of another embodiment of performing a matrix multiply operation.

Referring now to FIG. 13, a timing diagram 1200B of another embodiment of performing a matrix multiply operation is shown. Timing diagram 1200B is intended to be a continuation of the operations shown in timing diagram 1200A (of FIG. 12). In cycle 6, the matrix multiply pipeline performs the second phase of a matrix multiply operation while the FMA pipeline can initiate new FMA operations. Also, results can be written to memory in cycle 6. In cycles 7-8, the next phases of the matrix multiply operation can be performed by the matrix multiply pipeline while the FMA pipeline accesses the accumulation VGPR file for operands and performs operations which overlap with the matrix multiply operation. This pattern of operations can be continued for any number of additional cycles by the matrix multiply pipeline and FMA pipeline.

Figure 14:
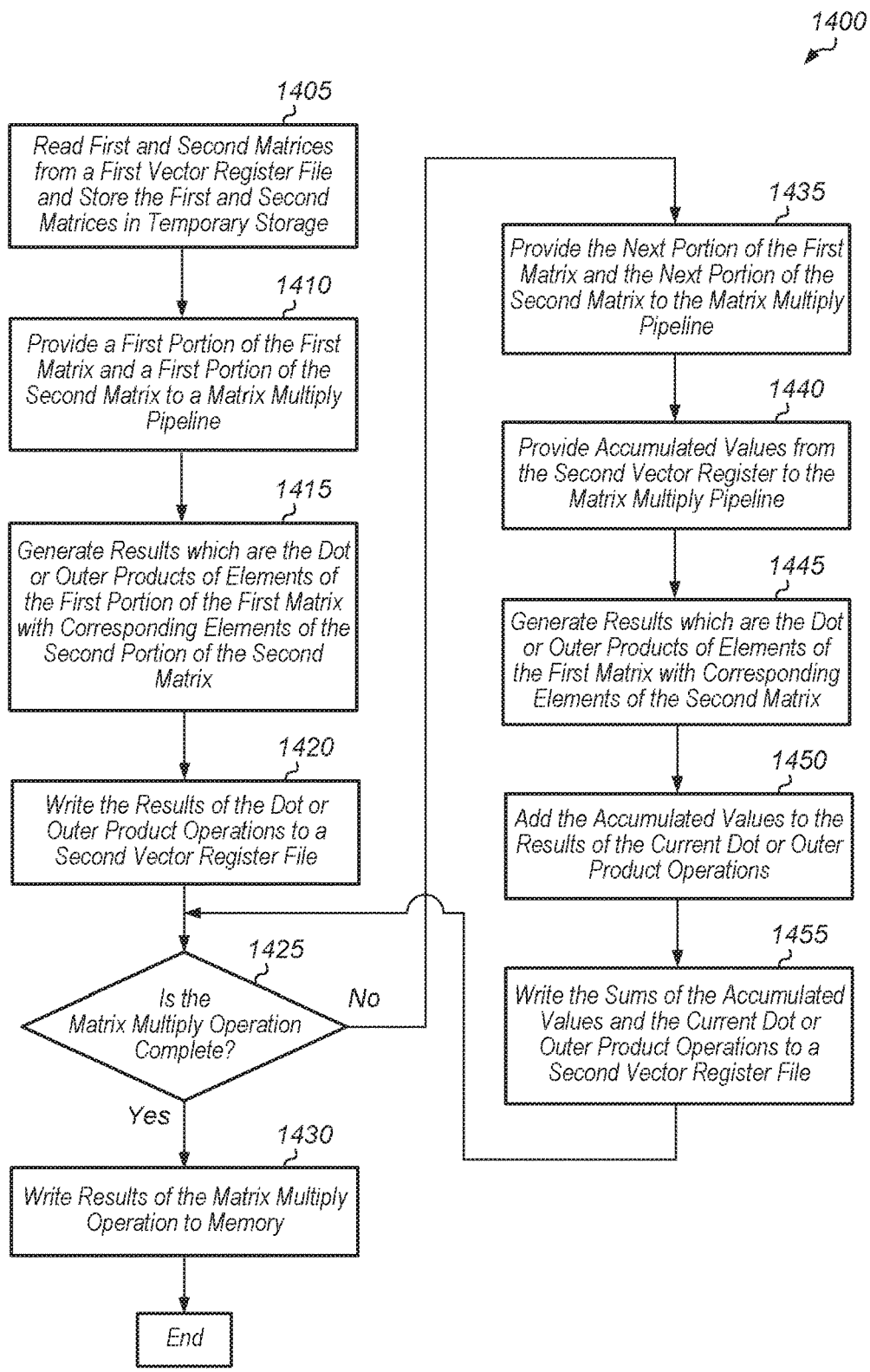
FIG. 14 is a generalized flow diagram illustrating one embodiment of a method for performing a matrix multiply operation.

Referring now to FIG. 14, one embodiment of a method 1400 for performing a matrix multiply operation is shown. For purposes of discussion, the steps in this embodiment are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 1400.

A stream processor reads first and second matrices from a first vector register file and stores the first and second matrices in temporary storage (block 1405). It is noted that the first and second matrices read and stored in block 1405 can actually be portions of larger matrices. Next, the stream processor provides a first portion of the first matrix and a first portion of the second matrix to a matrix multiply pipeline (block 1410). Then, the matrix multiply pipeline generates results which are the dot or outer products of elements of the first portion of the first matrix with corresponding elements of the first portion of the second matrix (block 1415). Next, the matrix multiply pipeline writes the results of the dot or outer product operations to a second vector register file (block 1420).

Then, if the matrix multiply operation is complete (conditional block 1425, "yes" leg), then the stream processor writes results of the matrix multiply operation to memory (block 1430). After block 1430, method 1400 ends. If the matrix multiply operation is not complete (conditional block 1425, "no" leg), then the stream processor provides the next portion of the first matrix and the next portion of the second matrix to the matrix multiply pipeline (block 1435). The stream processor also provides accumulated values from the second vector register file to the matrix multiply pipeline (block 1440). In another embodiment, the accumulated values can be read from memory and provided to the matrix multiply pipeline. In one embodiment, the accumulated values are the results of the previous dot product operations performed by the matrix multiply pipeline.

Next, the matrix multiply pipeline generates results which are the dot or outer products of elements of the first matrix with corresponding elements of the second matrix (block 1445). Also, the matrix multiply pipeline adds the accumulated values to the results of the current dot or outer product operations (block 1450). In another embodiment, the results of the current dot or outer product operations are added to the accumulated values. Then, the matrix multiply pipeline writes the sums (calculated in block 1450) to the second vector register file (block 1455). After block 1455, method 1400 returns to conditional block 1425.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a first vector register file;
    a second vector register file different from the first vector register file; and
    a first execution pipeline comprising circuitry configured to perform a matrix multiplication operation, wherein the first execution pipeline receives a first matrix and a second matrix from the first vector register file on a first path which includes a plurality of storage elements; and
    a second execution pipeline comprising circuitry configured to perform a fused multiply add (FMA) operation, wherein the second execution pipeline receives operands from the first vector register file on a second path which does not include the plurality of storage elements;
    wherein the system is configured to:
        fetch, from the first vector register file, the first matrix and the second matrix;
        store, in the plurality of storage elements, the first matrix and the second matrix;
        perform, using the first execution pipeline, the matrix multiplication operation by:
            using values of the first matrix and values of the second matrix stored in the plurality of storage elements; and
            storing intermediate values in the second vector register file; and
        perform, using the second execution pipeline, the FMA operation by fetching the operands from the first vector register file on the second path during one or more cycles that the first execution pipeline is performing the matrix multiplication operation.

2. The system as recited in claim 1, wherein the first execution pipeline is further configured to:
    calculate, in a first cycle, a first portion of an intermediate matrix that is an outer product of a given column of the first matrix and a given row of the second matrix by using a first portion of the given column and an entirety of the given row; and
    calculate, in a second cycle after the first cycle, a second portion different from the first portion of the intermediate matrix by using a second portion different from the first portion of the given column and the entirety of the given row.

3. The system as recited in claim 1, wherein the system is configured to read a plurality of accumulation inputs from the second vector register file and provide the plurality of accumulation inputs to the first execution pipeline, wherein an output of a previous dot product operation is an accumulation input which is added to a sum for a current dot product operation.

4. The system as recited in claim 1, wherein the system is further configured to:
    fetch a given column of the first matrix and a given row of the second matrix from the first vector register file only once until each element of a resulting matrix is updated by an outer product operation that generates a matrix output comprising two or more dimensions based on the given column and the given row; and
    store the first matrix and the second matrix in the plurality of storage elements for reuse by only the first execution pipeline.

5. The system as recited in claim 1, wherein the first execution pipeline is further configured to write a matrix output of the matrix multiplication operation to any location of the second vector register file and not the first vector register file.

6. The system as recited in claim 5, wherein the system is further configured to:
    perform, using the second execution pipeline, the FMA operation with the operands for the FMA operation concurrently with the matrix multiplication operation performed by the first execution pipeline; and
    write an output of the FMA operation to the first vector register file.

7. The system as recited in claim 1, wherein the first execution pipeline further comprises:
    a plurality of dot product units configured to perform the matrix multiplication operation; and
    a crossbar configured to rotate elements of the first matrix before sending the elements of the first matrix to the plurality of dot product units while elements of the second matrix remain unchanged for the plurality of dot product units.

8. A method comprising:
    fetching, by circuitry from a first vector register file, a first matrix and a second matrix;
    storing, by the circuitry in a plurality of storage elements, the first matrix and the second matrix;
    performing, using circuitry of a first execution pipeline, a matrix multiplication operation by:
        using values of the first matrix and values of the second matrix stored in the plurality of storage elements, wherein the first execution pipeline receives the first matrix and the second matrix from the first vector register file on a first path which includes the plurality of storage elements; and storing intermediate values in a second vector register file different from the first vector register file; and performing, using circuitry of a second execution pipeline different from the first execution pipeline, a fused multiply add (FMA) operation by fetching operands from the first vector register file during one or more cycles that the first execution pipeline is performing the matrix multiplication operation, wherein the second execution pipeline receives the operands from the first vector register file on a second path which does not include the plurality of storage elements.

9. The method as recited in claim 8, further comprising:
calculating, in a first cycle, a first portion of an intermediate matrix that is an outer product of a given column of the first matrix and a given row of the second matrix by using a first portion of the given column and an entirety of the given row; and calculating, in a second cycle after the first cycle, a second portion different from the first portion of the intermediate matrix by using a second portion different from the first portion of the given column and the entirety of the given row.

10. The method as recited in claim 8, further comprising reading a plurality of accumulation inputs from the second vector register file and providing the plurality of accumulation inputs to the first execution pipeline, wherein an output of a previous dot product operation is an accumulation input which is added to a sum for a current dot product operation.

11. The method as recited in claim 10, further comprising:
fetching a given column of the first matrix and a given row of the second matrix from the first vector register file only once until each element of a resulting matrix is updated by an outer product operation that generates a matrix output comprising two or more dimensions based on the given column and the given row; and storing the first matrix and the second matrix in the plurality of storage elements for reuse by only the first execution pipeline.

12. The method as recited in claim 8, further comprising writing a matrix output of the matrix multiplication operation to any location of the second vector register file and not the first vector register file.

13. The method as recited in claim 12, further comprising:
performing, using the second execution pipeline, the FMA operation with the operands for the FMA operation concurrently with the matrix multiplication operation performed by the first execution pipeline; and writing an output of the FMA operation to the first vector register file.

14. The method as recited in claim 8, further comprising:
performing the matrix multiplication operation by a plurality of dot product units; and rotating, by a crossbar of the first execution pipeline, elements of the first matrix before sending the elements of the first matrix to the plurality of dot product units while elements of the second matrix remain unchanged for the plurality of dot product units.

15. An apparatus comprising:
a plurality of vector register files; and
a plurality of execution pipelines coupled to the plurality of vector register files;
wherein the apparatus comprises circuitry configured to:
fetch, from a first vector register file of the plurality of vector register files, a first matrix and a second matrix;

store, in a plurality of storage elements, the first matrix and the second matrix;

perform, using circuitry of a first execution pipeline of the plurality of execution pipelines, a matrix multiplication operation by:
using values of the first matrix and values of the second matrix, wherein the first execution pipeline receives the first matrix and the second matrix from the first vector register file on a first path which includes the plurality of storage elements; and storing intermediate values in a second vector register file; and perform, using circuitry of a second execution pipeline of the plurality of execution pipelines, a fused multiply add (FMA) operation by fetching operands from the first vector register file during one or more cycles that the first execution pipeline is performing the matrix multiplication operation, wherein the second execution pipeline receives the operands from the first vector register file on a second path which does not include the plurality of storage elements.

16. The apparatus as recited in claim 15, wherein the apparatus is further configured to:
calculate, in a first cycle, a first portion of an intermediate matrix that is an outer product of a given column of the first matrix and a given row of the second matrix by using a first portion of the given column and an entirety of the given row; and calculate, in a second cycle after the first cycle, a second portion different from the first portion of the intermediate matrix by using a second portion different from the first portion of the given column and the entirety of the given row.

17. The apparatus as recited in claim 16, wherein the apparatus is configured to read a plurality of accumulation inputs from the second vector register file and provide the plurality of accumulation inputs to the first execution pipeline, wherein an output of a previous dot product operation is an accumulation input which is added to a sum for a current dot product operation.

18. The apparatus as recited in claim 17, wherein the apparatus is configured to:
fetch a given column of the first matrix and a given row of the second matrix from the first vector register file only once until each element of a resulting matrix is updated by an outer product operation that generates a matrix output comprising two or more dimensions based on the given column and the given row; and store the first matrix and the second matrix in the plurality of storage elements for reuse by only the first execution pipeline.

19. The apparatus as recited in claim 15, wherein the apparatus is further configured to write a matrix output of the matrix multiplication operation to any location of the second vector register file and not the first vector register file.

20. The apparatus as recited in claim 19 wherein the apparatus is further configured to:
perform, using the second execution pipeline, the FMA operation with the operands for the FMA operation concurrently with the matrix multiplication operation performed by the first execution pipeline; and write an output of the FMA operation to the first vector register file.

* * * * *

UNITED STATES PATENT AND TRADEMARK OFFICE
CERTIFICATE OF CORRECTION

PATENT NO. : 12,067,401 B2
APPLICATION NO. : 15/855637
DATED : August 20, 2024
INVENTOR(S) : Chen et al.

Page 1 of 1

It is certified that error appears in the above-identified patent and that said Letters Patent is hereby corrected as shown below:

In the Claims

Column 14, Claim 20, Line 58, please delete "claim 19 wherein" and substitute -- claim 19, wherein --.

Signed and Sealed this
Thirty-first Day of December, 2024

Derrick Brent
*Acting Director of the United States Patent and Trademark Office*